Figure 1:
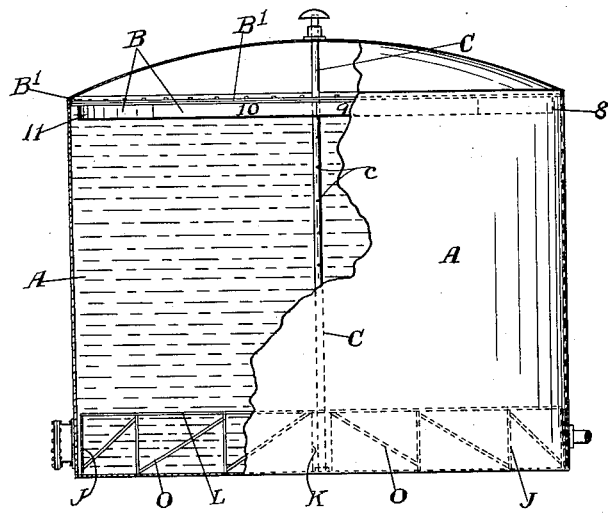

March 17. 1925. 1,529,767
J. J. BRIERS ET AL
STORAGE TANK FOR PETROLEUM AND OTHER LIQUIDS OF A VOLATILE NATURE
Filed Feb. 13, 1924 4 Sheets-Sheet 2

March 17, 1925. 1,529,767
J. J. BRIERS ET AL
STORAGE TANK FOR PETROLEUM AND OTHER LIQUIDS OF A VOLATILE NATURE
Filed Feb. 13, 1924 4 Sheets-Sheet 3
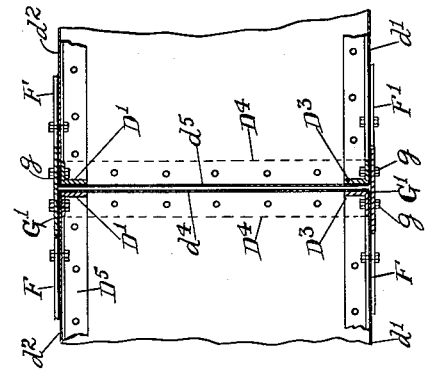
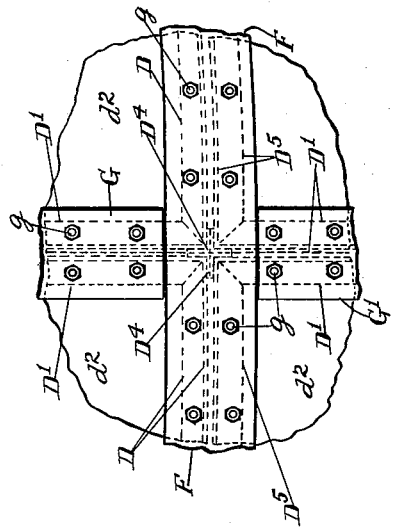
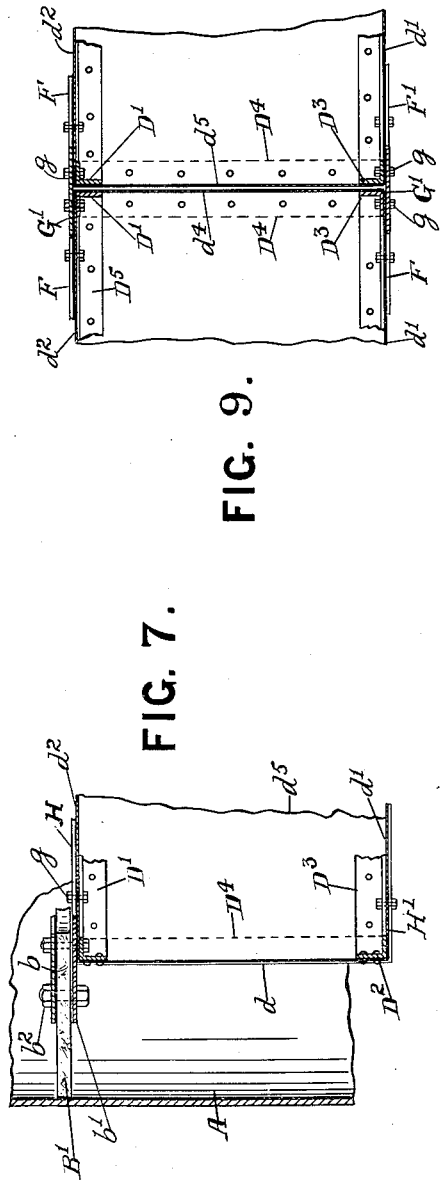
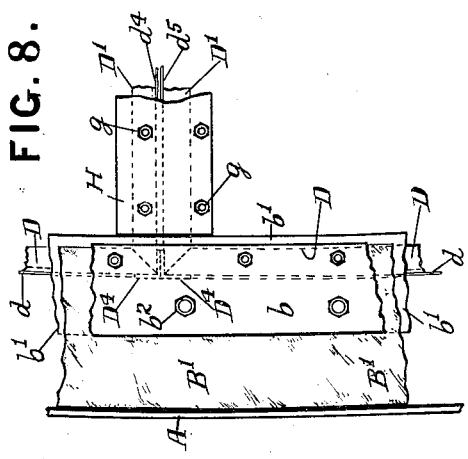

March 17, 1925.

J. J. BRIERS ET AL 1,529,767

STORAGE TANK FOR PETROLEUM AND OTHER LIQUIDS OF A VOLATILE NATURE

Filed Feb. 13, 1924  4 Sheets-Sheet 4

Patented Mar. 17, 1925.

1,529,767

UNITED STATES PATENT OFFICE.

JOHN JAMES BRIERS, OF COTTINGHAM, AND WILFRED GLANVILLE, OF PRESTON, ENGLAND.

STORAGE TANK FOR PETROLEUM AND OTHER LIQUIDS OF A VOLATILE NATURE.

Application filed February 13, 1924. Serial No. 692,478.

*To all whom it may concern:*

Be it known that we, JOHN JAMES BRIERS and WILFRED GLANVILLE, subjects of the King of Great Britain, residing at Cottingham and Preston, respectively, both near Kingston-upon-Hull, in the county of York, England, have invented certain new and useful Improvements in Storage Tanks for Petroleum and Other Liquids of a Volatile Nature, of which the following is a specification.

This invention relates to storage tanks for petroleum spirit and other liquids of a volatile nature.

Petroleum spirit, benzol, alcohol and like volatile liquids stored in bulk in storage tanks are, owing to the roofs of the tanks being ventilated and thus not being airtight, liable to loss in quantity by evaporation, and to deterioration in quality as a result of air gaining access to the tank, and are also liable to become ignited and to explode should a light or spark of any kind inadvertently come into contact with the vapour given off by them, considerable quantities of volatile liquids stored in tanks being lost in a year as a result of evaporation alone.

The object of our invention is to so seal the liquid in storage tanks that evaporation is entirely obviated, so not only preventing loss of spirit or the like and liability of the spirit becoming ignited, but air cannot have access to the liquid, consequently deterioration in the quality of the liquid is prevented.

In carrying our invention into effect, we employ in the tank, a float, plate or disc made of any suitable metal, material or substance and adapted to be an easy working fit in the tank, the said float, disc or plate being adapted to rest on the top of the liquid in the tank, or to be supported above the level of such liquid.

A convenient device consists in the case, say for example, of a circular storage tank for holding a large quantity of liquid, of a circular float of a diameter only slightly less than that of the interior of the tank whereby it will float on the top of the liquid and will rise and fall with the liquid as the quantity of the liquid in the tank is increased by the addition of more liquid thereto, or is decreased by the withdrawal of some of the liquid.

Means of any suitable kind are provided for closing the space between the periphery of the float and the inside face of the tank, one and a convenient means for the purpose which we describe by way of example only, consisting in providing the edge of the float with a ring of leather, india rubber, or other preferably flexible material which extends around the edge of the float and bears on the inside face of the tank, so that the space between the periphery of the float and the inside face of the tank is effectually sealed.

The float may have a continuous hollow interior, or it may be made in sections so that should a section be damaged or be found to be defective, it can be removed and a sound section substituted for it.

If the float is made in sections, the sections are so secured together that the passage of oil or spirit, or the gas arising therefrom, between them, is impossible.

The float is provided with a central hole through which passes a perpendicular dip tube provided with holes in its wall through which liquid in the tank can enter such tube, the tube being for the purpose of allowing of the quantity of liquid in the tank being measured, without which tube access to the contents of the tank for the purpose of measuring the same could not be obtained.

We preferably provide a platform in the bottom of the tank for the float to rest on when it lowers to a predetermined depth, whereby such float is prevented from sinking into any sediment that may have settled in the bottom of the tank.

If desired, suitable means such as rope and block tackle, a hand or other winch or windlass, or the like, may be provided for hoisting the float out of the tank and lowering it thereinto.

Figure 2:
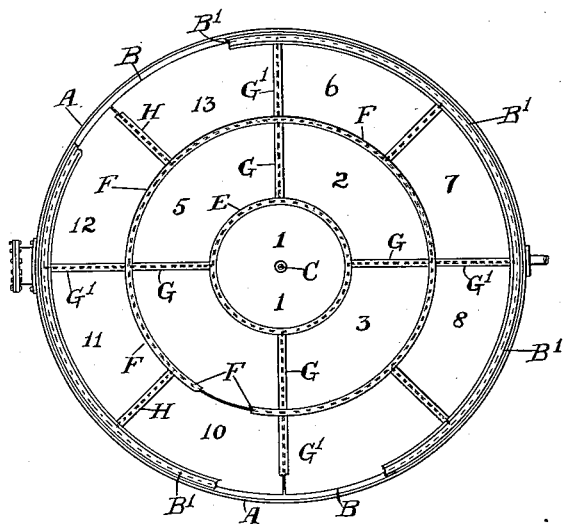
Figure 4:
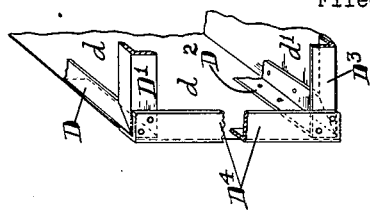
Figure 6:
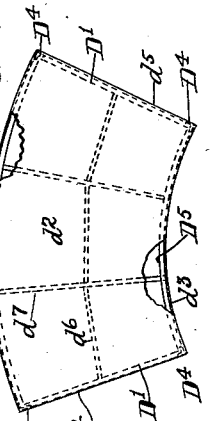
Figure 3:
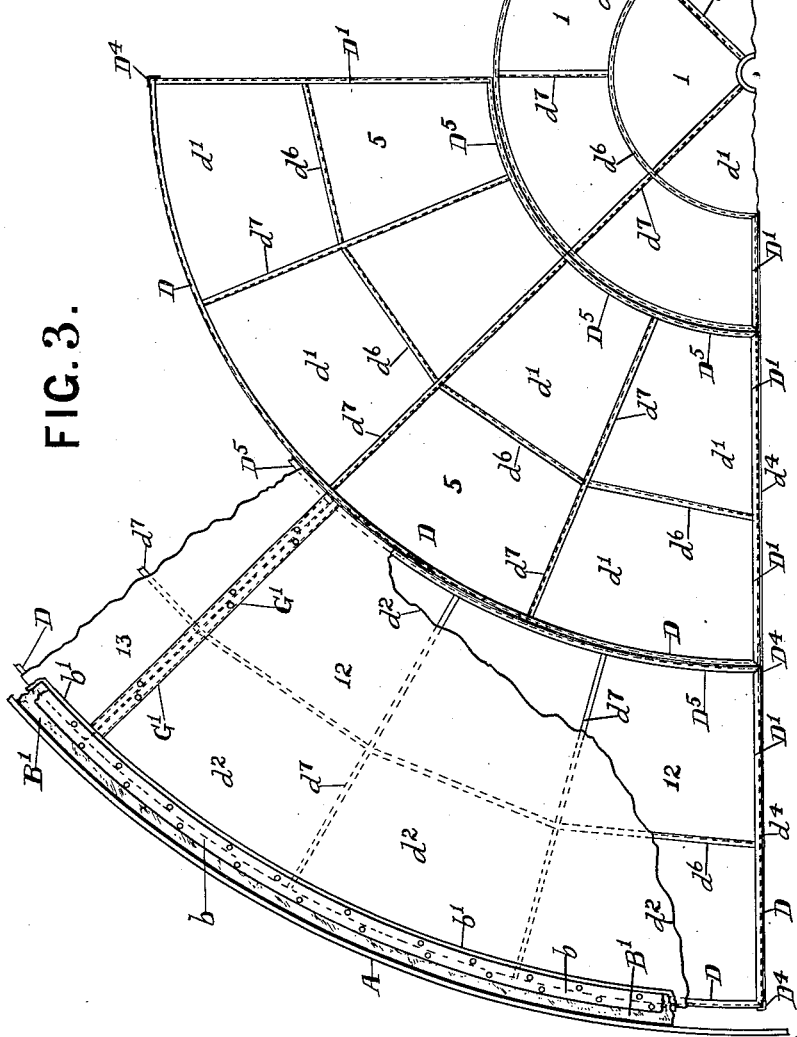
Figure 5:
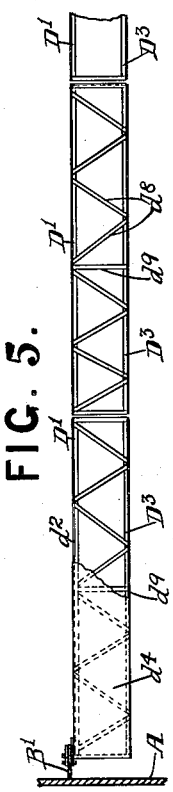

Having thus stated the object and described the nature of our invention we will now proceed to describe our said invention in greater detail and in so doing will refer to the accompanying four sheets of explanatory drawings which show one embodiment of our invention, and of which Fig. 1 is an elevation of a petroleum or like storage tank provided with a float in accordance with our invention and with a platform on which the float rests when the petroleum or the like in the tank is drawn off, the storage tank being shown partly in section, and Fig. 2 is a plan view of the tank with the top removed to show the top of the float. Fig. 3 is a plan view of a portion of the float showing how it is constructed of hollow sections or casings connected together, the sheet metal tops of some of the sections or casings being removed to show the strengthening bars or members inside the sections or casings, and also showing the leather or like ring secured to its periphery to seal the annular space between the float and the inside face of the tank. Fig. 4 is a broken perspective view of one of the hollow sections of which the float is built up. Fig. 5 is an elevation of a portion of the float, part of the metal sheeting of the float sections being broken away to show the interior of such sections. Fig. 6 is a plan view of one of the sections of the float, parts of the top metal sheeting of the same being broken away. Fig. 7 is a vertical section of a portion of the tank and of one section of the float and shows a portion of the leather or like ring which seals the annular space between the float and the inside face of the tank. Fig. 8 is a plan view of the same. Fig. 9 is a vertical section of a portion of each of two float sections showing the method of connecting them, and Fig. 10 is a plan view of Fig. 9 showing a portion of each of four hollow sections of the float and the metal bars which connect the same.

Figure 11:
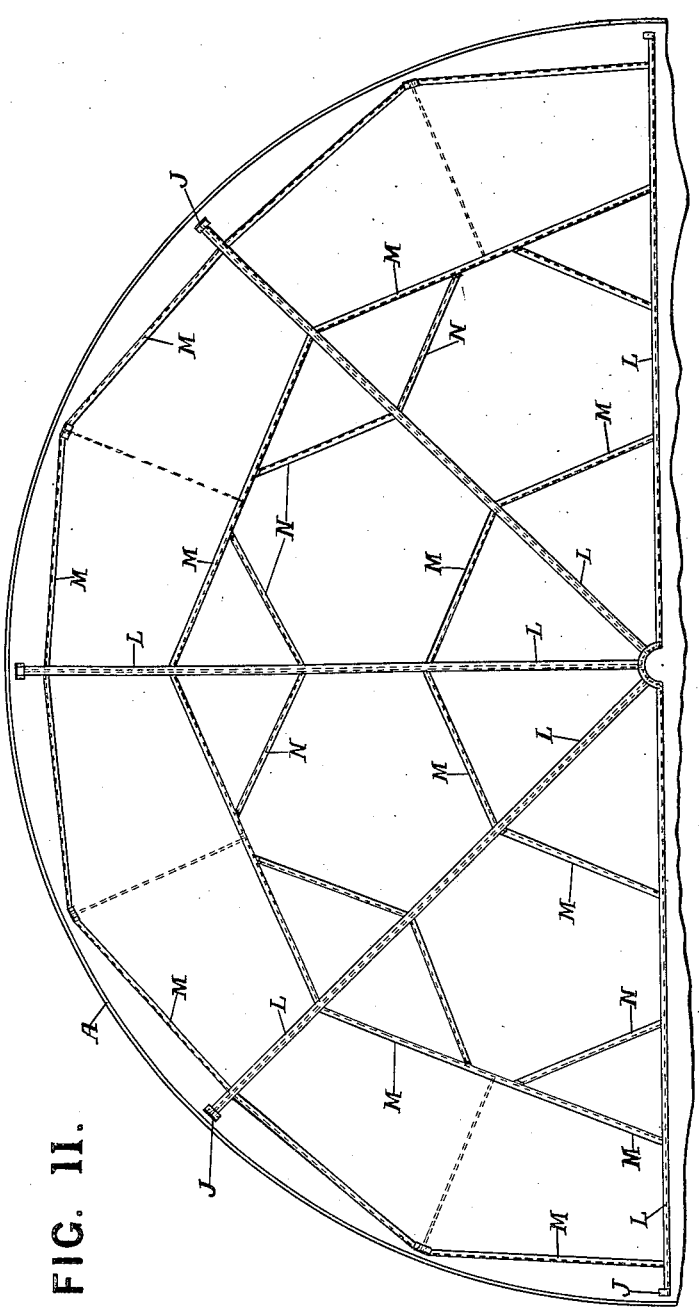
Figure 12:
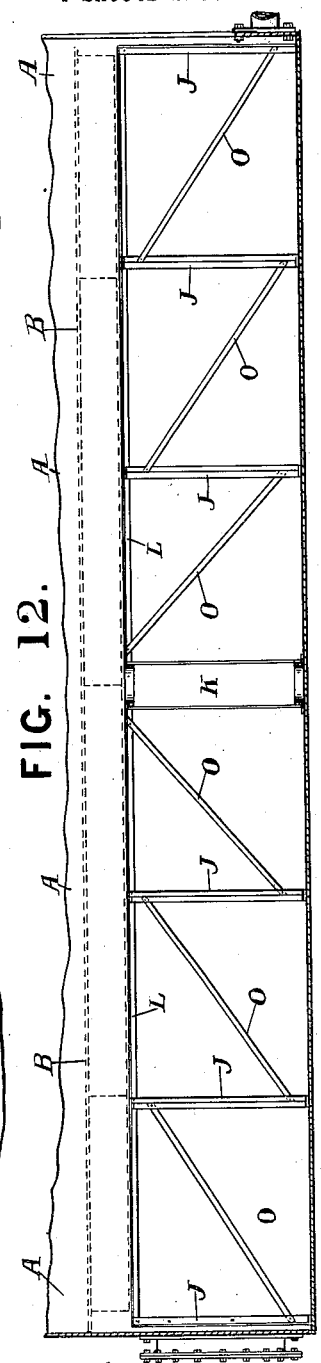

Fig. 11 is a plan view of one half of the platform for the float to rest on when it descends to that level in the tank, and Fig. 12 is a sectional elevation of the lower portion of the tank showing the platform.

Referring first to Figs. 1 and 2 of the drawings, A is the tank which contains the petroleum spirit or the like and which is of the usual construction, B is the float which is of a little smaller diameter than the tank, and which rests on the surface of the petroleum or the like in the tank, $B^1$ is a ring of leather, india rubber or other suitable preferably flexible material attached to the top of the float, and the periphery of which bears on the inside face of the tank and closes the annular space between the periphery of the float and the inside face of the tank, and C is the dip tube which we employ to enable the contents of the tank to be measured, and which extends from the bottom of the tank and projects upwardly through a hole in the centre of the float and through a hole in the dome of the tank, $c$ being holes in the said tube through which liquid in the tank can enter the tube.

We construct the float according to a preferred mode, in the form of a number of air and fluid tight hollow metal sections or casings, hereinafter referred to only as sections, Fig. 2 showing the float built up of thirteen sections, a circular one, 1, in the centre, four intermediate segmental ones, 2, 3, 4 and 5 surrounding the said centre one (1), and eight outer segmental ones 6, 7, 8, 9, 10, 11, 12 and 13.

Referring to Figs. 3 to 10 inclusive of the drawings which illustrate one and a convenient mode of constructing the sections and of securing them together to form the float, the sections are each constructed of a framework composed of angle iron, to the top, bottom, sides and ends of which framework, pieces of sheet metal are secured by bolts, rivets or the like, Fig. 4 showing a portion of one of the sections which may be either an intermediate one or an outer one, D indicating the top outer piece, $D^1$ one of the top end pieces, $D^2$ the bottom outer piece, $D^3$ one of the bottom end pieces, and $D^4$ a perpendicular piece bolted or riveted to the meeting ends of the pieces D, $D^1$ and $D^2$, $D^3$, $d$ being a piece of sheet metal attached to the outer side of the frame, and $d^1$ a similar piece of sheet metal attached to the bottom of the frame. The complete section is shown in plan view at Fig. 6.

The top inner piece $D^5$, the top piece $d^2$ of sheet metal which form the top of the section, the piece $d^3$ which forms the inner side, and the two pieces $d^4$ and $d^5$ which form the two ends, are indicated in Figs. 5 and 6 of the drawings.

The sections are preferably strengthened by radial stays $d^6$, and stays $d^7$ which connect such radial stays, as shown in Figs. 3 and 6, and by inclined and vertical stays $d^8$, and $d^9$ respectively shown in Fig. 5.

The intermediate sections or casings are arranged side by side in a circle around the centre circular casing and are secured thereto by metal rings bolted to the top and bottom edge of the said centre section and to the adjoining edges of the intermediate sections, E (Fig. 2) indicating the ring that secures the top of the centre section to the tops of the intermediate sections.

The intermediate and outer sections are similarly secured together, F and $F^1$ (Figs. 2, 9 and 10) indicating the rings by means of which the tops and bottoms of the said intermediate and outer sections are secured together.

The intermediate sections are secured together by flat metal plates G, $G^1$, which project over the adjoining edges of the sections and are secured to such adjoining edges by bolts $g$, see more particularly Figs. 2, 9 and 10 of the drawings, and the outer sections are similarly secured together by flat plates H, $H^1$, see more particularly Figs. 2, 7 and 8 of the drawings.

If desired, the plates G, $G^1$ which secure the intermediate sections together may be sufficiently long to effect the securing together of alternate outer sections.

The leather or like ring $B^1$ which closes the space between the periphery of the float B and the inside face of the tank, is secured to the float by any suitable means, the means shown in the accompanying drawings consisting of securing the inner portion of the said ring between two flat metal rings b, b¹ which may each be in a single piece, or composed of a plurality of pieces, and which are secured by bolts b² to the outer portion of the tops of the said outer sections.

Referring now to Figs. 11 and 12 of the drawings which illustrate one half of the platform on which the float rests when the petroleum or like contents of the tank lower to or below the top of such platform, such platform is in the form of a skeleton metal framework comprising perpendicular members J and a central perpendicular tubular member K connected by radial members L, the said radial members being connected by stays M, some or all of which may be further connected to the radial members by stays N, see Fig. 11.

The perpendicular members are preferably strengthened by means of diagonal connecting stays O as shown in Fig. 12.

The perpendicular tube K allows of the dip tube C which passes through the hole in the centre of the float and on which the float can slide, being continued to the bottom of the tank, the bottom portion of such dip tube projecting into such tube K and its bottom end fitting into the bottom of the said tube.

The platform in addition to supporting the float when it descends sufficiently far in the tank, also serves as a support for the several loose sections of the float to enable workmen in the tank to assemble them, and connect them together, so allowing of the float being built up inside the tank, and obviating its having to be constructed outside the tank and hoisted up and lowered into the tank in its completed state.

What we claim and desire to secure by Letters Patent is:—

1. The combination, with a storage tank, of a float a little smaller than the internal diameter of the tank, and a platform for supporting the float when the liquid in the tank is low, said platform comprising a skeleton framework arranged over the whole of the bottom of the tank and dividing it into substantially equal segments, said platform operating to form a space for sediment below the float.

2. The combination, with a storage tank, of a float a little smaller than the internal diameter of the tank, and a platform for supporting the float when the liquid in the tank is low, said platform comprising a skeleton framework having vertical members which rest on the tank bottom, radial members secured between the tops of the vertical members, and braces between said radial members, said platform operating to form a space for sediment below the float.

3. The combination with a tank for storing petroleum spirit and like volatile liquids in bulk, of a float comprising a plurality of air and liquid tight sections or casings so arranged and secured together as to form a circular float a little smaller in diameter than the internal diameter of the tank, a ring of leather or other suitable preferably flexible material so fitted to the float as to seal the space between the periphery of the float and the inside face of the tank, and a platform in the form of a skeleton framework arranged in the bottom of the tank for the float to rest on when the liquid in the tank descends to or below the level of the top of such platform.

4. In a tank for storing petroleum spirit and like volatile liquids in bulk, said tank being provided with a dome which closes its top, a float comprising a plurality of air and liquid tight sections or casings the whole so arranged and fitted together as to form a circular float a little smaller in diameter than the internal diameter of the tank, a ring of leather or other suitable preferably flexible material so fitted to the float as to seal the space between the periphery of the float and the inside face of the tank, and a perpendicular dip tube provided with holes in its wall by which liquid contained in the tank can enter such tube, a hole through the centre of the float and a hole through the dome of the tank for such tube to pass through.

In testimony whereof we affix our signatures.

JOHN JAMES BRIERS.
WILFRED GLANVILLE.